Feb. 25, 1969     V. A. GRAHAM     3,429,000

FISH SKINNING DEVICE

Filed Nov. 13, 1967

Vincent A. Graham
      INVENTOR.

BY *Lucas J. O. Foster*

His ATT'Y

United States Patent Office 3,429,000
Patented Feb. 25, 1969

3,429,000
FISH SKINNING DEVICE
Vincent A. Graham, Salem, S. Dak. 57058
Filed Nov. 13, 1967, Ser. No. 682,013
U.S. Cl. 17—7  6 Claims
Int. Cl. A22c 25/17; A47j 17/14

ABSTRACT OF THE DISCLOSURE

A fish skin remover comprising a holder adapted to grasp the skin of the fish and a cutter having blades to cut a strip of skin of uniform width while a separating knife separates the strip of skin from the flesh of the fish.

---

This invention pertains to devices for removing the skin of a fish and more particularly to a device adapted to be grasped by the operator and to readily separate a strip of skin from the flesh of a fish.

Cleaning of fish after catching them is a common problem of all sports fishermen. The best mode of cleaning many fish is to remove the skin. This is particularly true of the catfish family but may also be done for nearly all species of fish.

The devices for the removal of skin are also varied. The simplest is just a sharp knife which may be inserted between the skin and the flesh to separate them and a plier or similar device for pulling off the skin as it is separated.

By my invention, I provide a device by which the skin of the fish may be readily held by one hand and a strip of skin separated and removed by a device operated by the other hand. The device cuts the skin into strips which are readily removable.

A more complete understanding of my invention and its embodiment may be had by reference to the following specification and the drawings in which.

Figure 1:
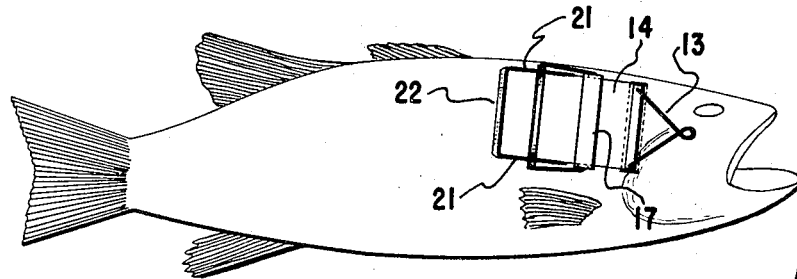
FIG. 1 is a view of the fish showing my device in place ready for use.
Figure 2:
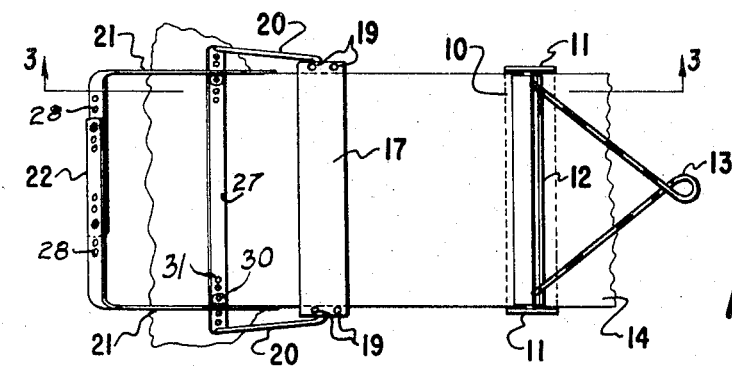
FIG. 2 is a top plan view of my device attached to a strip of skin.
Figure 3:
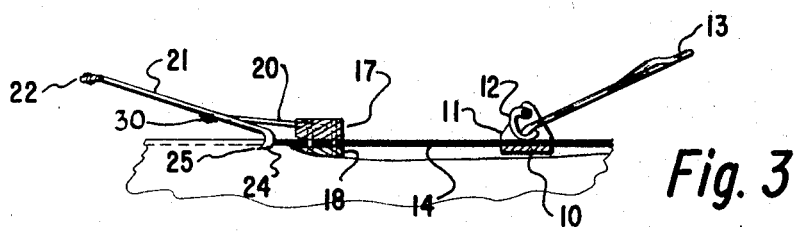
FIG. 3 is a sectional view through my device along line 3—3 of FIG. 2.

Briefly my invention comprises a clamping arrangement for the holding of the skin of a fish combined with a device adapted to cut a uniform strip of skin while at the same time separating the strip from the flesh of the fish.

More specifically, and referring to the drawings, my clamping device comprises a flat bar 10 extending over a width approximately that of the strip to be cut as will later appear. At the ends of the bar, ears 11 are provided standing upward from the bar. A clamping member 12 is pivotally mounted on the ears 11 so that a pull on this member will tend to draw the member 12 downward firmly against the bar 10. A flexible handle member 13 is attached securely to the clamping member so that the device can be easily held as it is clamped onto the skin 14 of the fish.

The cutter comprises a separating instrument having a body formed of an upper guide bar 17 to which a lower separating knife 18 is adjustably attached by means of screws 19. These screws are arranged so that the space between the knife 18 and bar 17 can be adjusted to account for differences in the thickness of the skin of various fish.

The upper bar is pulled by means of rods 20 extending outwardly beyond the sharpened edge of the knife 18, but fastened to the upper bar 17. The rods 20 are joined by a cross member 27. Handle rods 21 extend still further away from the sharpened edge of the knife and terminating in a handle 22 which may be fastened to them.

At about the junction of the rods 20 with the handle rods 21, I provide a pair of small vertical knives 24 fixed to the handle rods. These knives are shaped in the form of a hook having a sharpened point 25 adapted to extend under the skin of the fish. The blades 24 are substantially parallel and have sharpened edges facing in the direction toward the handle 22. Thus, pulling of the blades across the skin of the fish will cut the skin into a strip of substantially uniform width. In order to make my device usable with differing sizes of fish, I provide for some adjustment in the width of strip to be cut by the knives 24. Thus, the handle 22 may be formed of a pair of overlapping strips having matching holes 28 by which its width may be adjusted. Also, the fastening of the rods 21 to the cross member 27 may be adjustable by the use of a pin or bolt 30 selectively placed through one of a series of holes 31 in the cross member.

Figure 4:
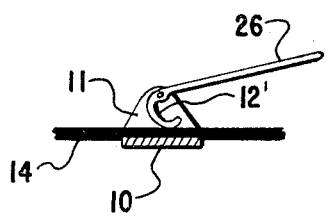
FIG. 4 is a sectional view similar to FIG. 3 of an alternate embodiment of my invention.

In the alternate embodiment shown in FIG. 4, I have changed the clamping device slightly. I still use the bar 10 having the ears 11. The clamping member 12' is also similar and is similarly pivoted to the ears 11. However, the handle 26 may be formed of a stiff material and is solidly fixed to the upper part of the member 12' so that the clamping is accomplished by a downward pressure (in the figure) of the handle.

The use of my device would seem fairly obvious. The skin of the fish is cut completely around the body of the fish near the head. A start is made to the removal of the skin by carefully starting the cutting of a strip with the parallel knives 24 and the beginning of the separation of the skin by use of the lower knife 18. As soon as the start is achieved, the clamping arrangement is attached to the skin. Then simply by pulling in opposite directions, the strip of skin can be removed from the fish. This procedure is repeated as often as may be necessary to skin the entire fish.

Having thus described my invention in its embodiment I am aware that further and extensive variations may be made therefrom without departing from the spirit and scope of my invention as limited only by the following claims.

I claim:

1. A fish skinning device comprising a cutting member having a pair of parallel blades having sharpened edges toward a forward position and adapted to cut through the skin of a fish, a separating device fixed in a position behind said blades and including a guide bar adapted to slide over said skin, a separating knife fixed to said guide bar in spaced relation thereto whereby said knife separates the skin from the flesh of the fish.

2. The device of claim 1 in which said parallel blades are hook-shaped having a point adapted to extend between the skin and flesh of the fish.

3. The device of claim 1 in which the separating knife is adjustably attached to the guide bar whereby the device may be adjusted for varying thickness of skin.

4. The device of claim 3 in which screw means are the adjustable fastening between the separating knife and the guide bar.

5. The device of claim 3 in which a handle is fixed to the parallel blades whereby said blade may be pulled through the skin.

6. The device of claim 5 in which said handle is of adjustable width and said parallel blades are connected to said guide bar in such a manner that the width between said blades is adjustable.

References Cited

UNITED STATES PATENTS

| | | | |
|---|---|---|---|
| 481,104 | 8/1892 | Clow | 17—7 |
| 1,472,618 | 10/1923 | Schwartz. | |
| 1,777,375 | 10/1930 | Merrick | 146—130 |
| 2,974,357 | 3/1961 | Berg | 17—8 |
| 3,099,307 | 7/1963 | Morgan | 146—203 |

FOREIGN PATENTS 874,638  4/1953  Germany.

LUCIE H. LAUDENSLAGER, *Primary Examiner.*

U.S. Cl. X.R.

146—203